Patented June 1, 1943

2,320,788

UNITED STATES PATENT OFFICE 2,320,788

TELEGRAPHIC TAPE TRANSMITTER

Albert W. Mills and Frank J. Furman, Endicott, N. Y., assignors to International Business Machines Corporation, New York, N. Y., a corporation of New York Application July 2, 1942, Serial No. 449,446

12 Claims. (Cl. 178—17)

This invention relates to telegraphic tape transmitters capable of initiating code groups of impulses upon sensing the code perforations in the tape.

An object of the present invention resides in the provision of an improved and simplified transmitter whereby the telegraphic tape can be sensed and fed at unusually high speeds.

To this end, provision is made whereby the operations of the tape sensing and feeding means are controlled cyclically by a single positionable inverted T lever. Electromechanical means are provided for normally preventing the said T lever from being operated by constantly operable driving means, thereby maintaining the tape sensing and feeding means inoperative. Upon energization and operation of the said electromechanical means, the driving means becomes effective to actuate the said T lever and render both tape feeding and sensing means operative. If the said energization is a momentary condition the operations of the tape feeding and sensing means are limited to a single cycle of operation, however, if the said energization is a sustained condition, successive cyclic operations are effected. Latching means are provided and include a latching lever pivotally supported by the upright arm of the T lever, so that the driving means is effective upon deenergization of the electromechanical means, to cause a tape feeding operation after the sensing means is rendered inoperative and before the tape feeding means is rendered inoperative.

Another object of the present invention resides in the provision of an improved telegraphic tape transmitter wherein positionable means are effective for controlling the operations of both tape feeding and sensing means, and upon disabling the connections of the constantly operable driving means and positionable means, permitting the tape feeding operation to be effected after the sensing means are rendered inoperative.

Other objects of the invention will be pointed out in the following description and claims and illustrated in the accompanying drawings, which disclose, by way of example, the principle of the invention and the best mode, which has been contemplated, of applying that principle.

Figure 1:
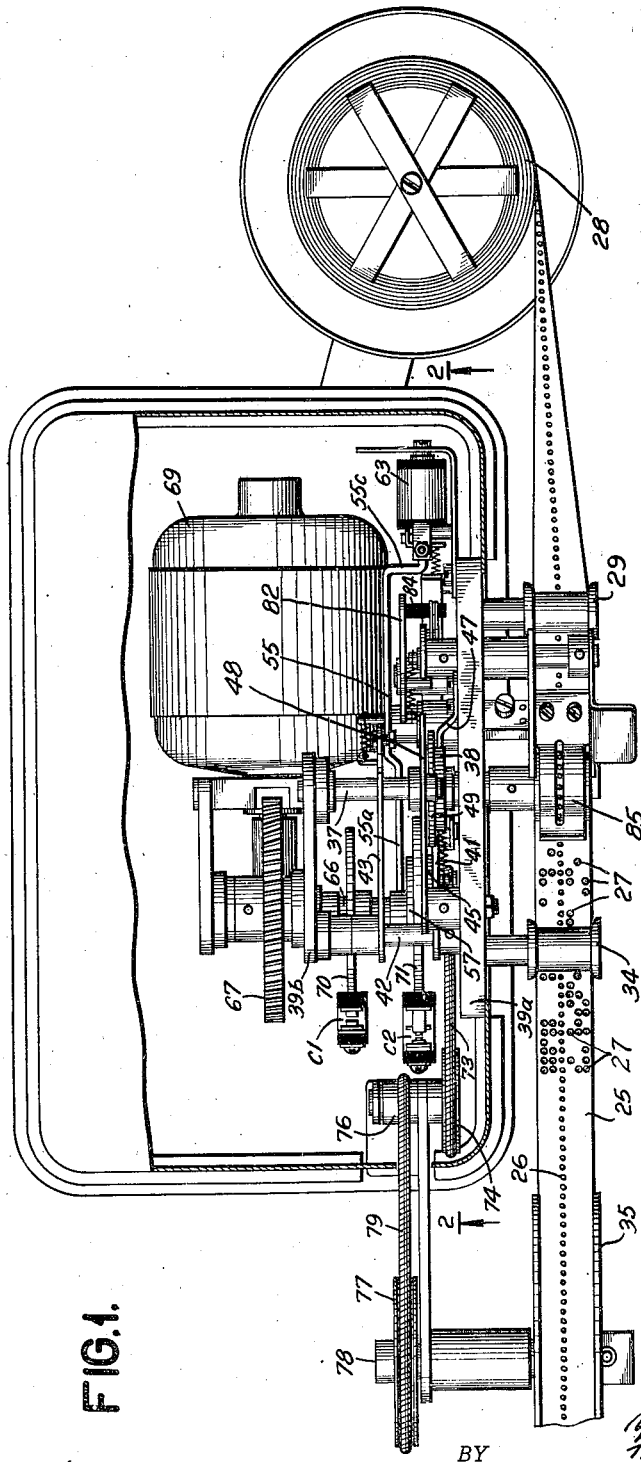
Fig. 1 is a plan view of the telegraphic tape transmitter.
Figure 2:
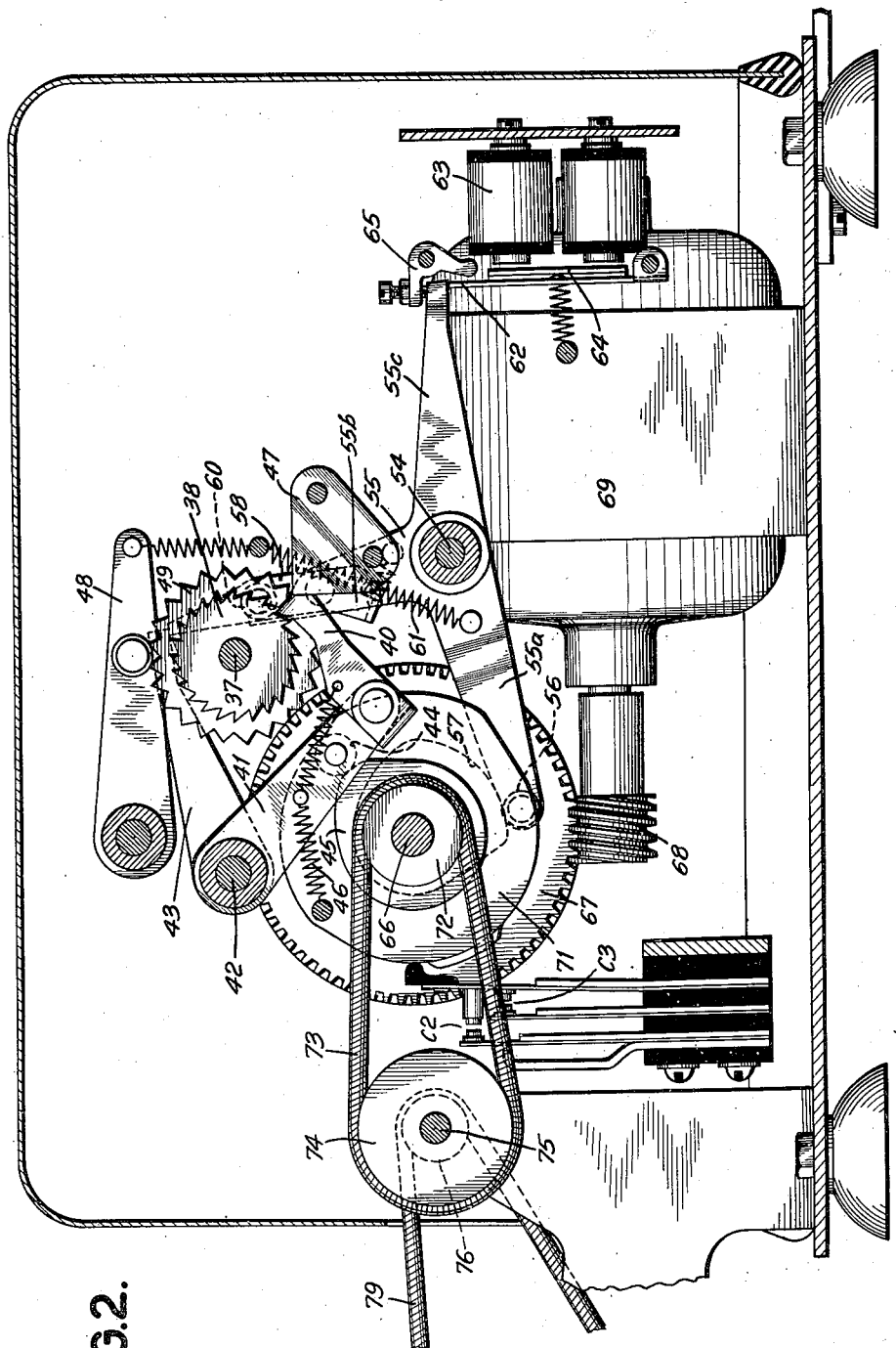
Fig. 2 is a sectional view taken along the lines 2—2 of Fig. 1.
Figure 3:
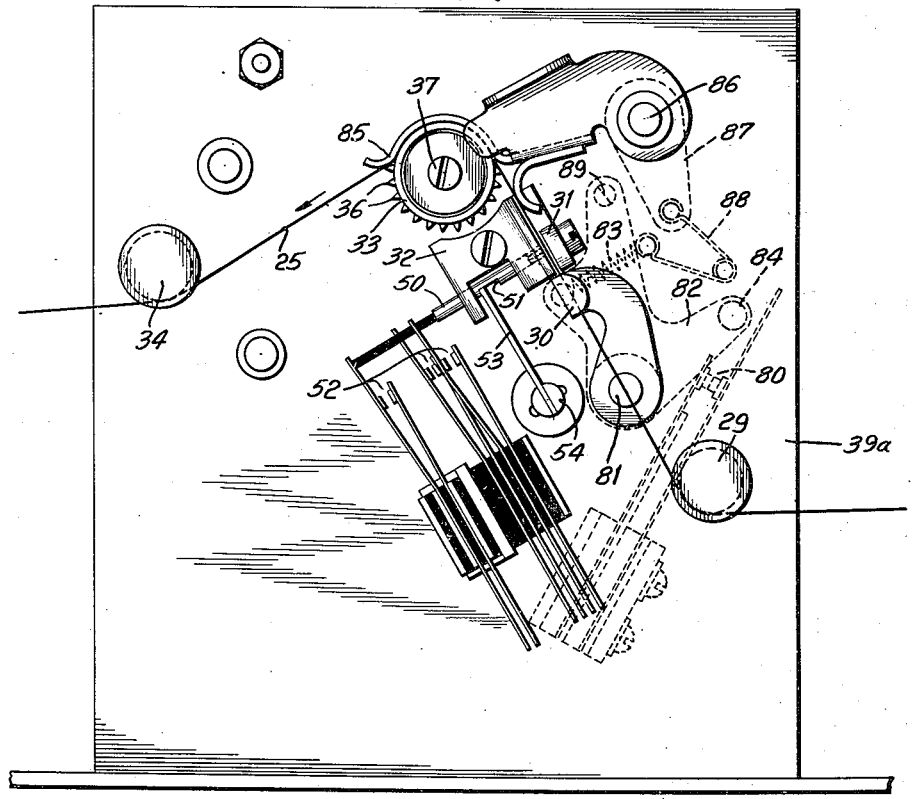
Fig. 3 is an elevation of the tape sensing elements.

Referring now to Figs. 1 and 3, the telegraphic tape 25, provided with the usual feed perforations 26 and combinational code perforations 27, is fed from a supply roll 28 under a guide post 29, over a tape guide arm 30, between a pair of separated blocks 31 and 32, over a sprocket wheel 33, and under a guide post 34 to a take-up reel 35. Sprocket wheel 33 is provided with the usual centrally located periphery teeth 36 for engaging the feed perforations 26 and feeding the tape in the direction shown by the arrow in Fig. 3. The said sprocket wheel is mounted on a shaft 37, suitably supported by side plate 39a and intermediate plate 39b, to which shaft ratchet wheel 38 is secured. Ratchet wheel 38 is rotated, step by step, by a spring urged pawl 40 (Fig. 2) pivotally mounted on a cam follower arm 41, the latter being secured to shaft 42 (supported by the said side and intermediate plates). Also secured to shaft 42 is a latch arm 43, which when released permits a cam roller 44, carried by the cam follower arm 41, to ride on the periphery of a constantly rotated cam 45, and follow the contour of the latter. The contour of cam 45 is designed so that, upon release of the latch arm, the cam follower arm 41 and pawl 40, during rotation of the cam, are partially rotated in a clockwise direction, by means of spring 46, thereby causing the pawl to ride over a tooth of the ratchet wheel and be in a position for advancing the ratchet wheel, one step, when the high point of the cam urges the cam follower arm and pawl in a counterclockwise direction. A fixed plate 47 secured to side plate 39a is provided with a camming surface which is engaged by the free end of pawl 40, as the latter is urged in a counterclockwise direction, thus, insuring a positive driving connection between the pawl and ratchet wheel, and, also preventing an overdrive of the ratchet wheel. The usual spring urged detent arm 48 is provided, and cooperates with a detent wheel 49 fixed to shaft 37 for maintaining the said shaft 37, ratchet wheel 38, and sprocket wheel 33 in the advanced position.

By this described mechanism, the tape 25 is advanced one step, for each cycle of operation of the machine for presenting the next transverse row of code perforations to the sensing elements. A single sensing element, such as sensing pin 50 (Fig. 3), having a shouldered recess 51, is provided for each unit of the code. The individual sensing pins are suitably disposed in individual openings formed in an U-shaped guide block 32, and are arranged to cooperate with individual sets of suitably disposed contact means 52. In the instant disclosure, five sets of contacts are provided, each set having an elongated spring blade which is engaged by an insulated end of the related sensing pin. With the sensing pins in retracted positions, as shown in Fig. 3, the said spring blades are urged sufficiently, to the left, to open the contacts 52.

Figure 4:
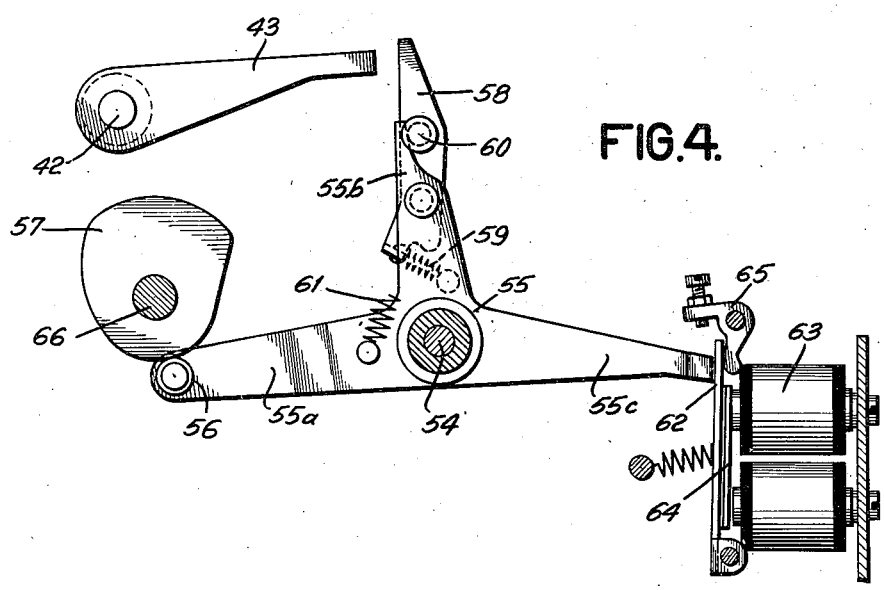
Figs. 4 and 5 are detail views showing different stages of operations of the inverted T lever.

Common to the said recesses of the sensing pins is a positionable vane or bail 53 secured to shaft 54. Shaft 54 is suitably journaled in side plate 39a and has secured thereto an inverted T or three armed lever 55, the left arm 55a of which, as viewed in Fig. 2, is provided with a cam roller 6 adapted to cooperate with a constantly rotated cam 57. The upright arm 55b of the said inverted T lever, carries a pivoted latch lever 58 which is urged, in a counterclockwise direction, by spring 59 so that the stop 60, fixed to the said latch lever, normally engages the upper extremity of the said upright arm of lever 55 (also see Figs 4 and 5). The extremity of the right arm 55c of lever 55, as viewed in Fig. 2, normally is urged, by spring 61, against the top edge of latch plate 62 secured to the released armature 64 of magnet 63, thus latching the said inverted T lever in the normal position shown in Fig. 2. Normally, the latch arm 43 is held in a raised or latched position as shown, by means of the pivoted latch lever 58, thereby maintaining the tape feed pawl 40 in its uppermost or end-of-the-stroke position, as indicated in Fig. 2. With the inverted T lever in the described normal position, the constantly cyclic operations of cams 45 and 57 exercise no controlling effects on the related cam follower arms 41 and 55a, respectively. Also, in the said normal position of the inverted T lever, the bail 53 is moved to its extreme position to the left, as viewed in Fig. 3, against the lower shoulders of recesses 51 of the sensing pins 50, thus holding the latter in their retracted positions, and maintaining the associated contacts 52 in normally open positions.

Upon momentary energization of control magnet 63, its armature is attracted and the latch plate 62 is withdrawn from the arm 55c, so that the said lever 55 is unlatched or released, and, under the influence of spring 61, the latter is urged in a clockwise direction, (see Fig. 4) causing (1) release of latch arm 43, due to withdrawal of latch lever 58 on arm 55b, (2) release of arm 55a and thereby permitting full or effective cooperation between cam 57 and cam roller 56, and (3) release of the sensing pins 50, due to the partial clockwise rotation of bail 53.

Upon release of latch arm 43, cam follower arm 41, during a cyclic operation of cam 45, is partially rotated, first, in a clockwise direction, and then, in a counterclockwise direction to advance the ratchet wheel 38, shaft 37, and sprocket wheel 33, by means of pawl 40, thereby advancing the tape, one step, and presenting the next transverse row of code perforations to the sensing pins.

Upon release of the sensing pins 50, the code perforations are detected or sensed, by the spring urged pins permitted to pass through the perforations and extend into suitable slots or openings formed in the block 31. The travel of the code groups of pins sensing the perforations is sufficient to permit the related contacts 52 to be closed. In this manner, code groups of impulses can be initiated in the individual signaling or control circuits connected to the said sets of contacts 52 for suitable controlling purposes.

Figure 5:
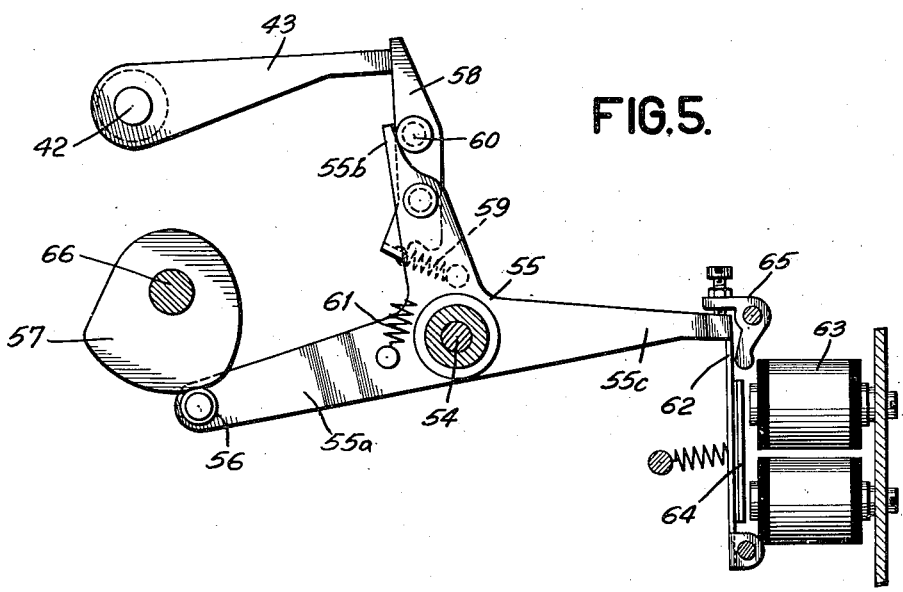

During a cyclic operation of cam 57, the lever 55 is first partially rotated in a clockwise direction, and then in a counterclockwise direction. When the highest portion of cam 57 is effective, the lever 55 is urged in a counterclockwise direction sufficiently to raise the arm 55c above the released latch plate 62, as shown in Fig. 5, thereby latching the lever 55 in the normal position. Also, during the cyclic operation of cam 57, and upon the partial counterclockwise rotation of lever 55 and shaft 54, the bail 53 is restored to its normal position, during which restoring opertion, the shouldered recesses of the displaced sensing pins 50 are engaged and withdrawn from the perforations in the tape to restore the said pins and associated contacts to their normal positions. The said sensing pins and contacts are locked in this normal position so long as lever 55 is maintained in the described latched position.

Figure 6:
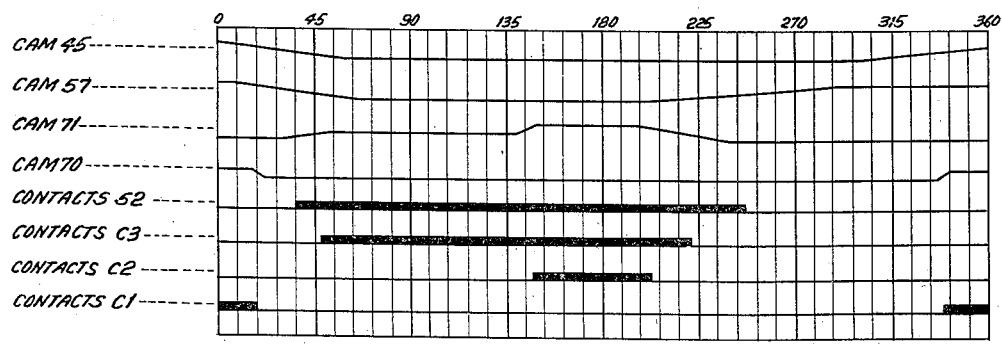
Fig. 6 is a timing chart.

Obviously, the described tape feeding operation must be suppressed until the actual sensing of the code perforations and withdrawal of the sensing pins from the tape are completed. In the instant case, it is preferred to prevent tape feeding until the sensing pins are latched in their normal positions. Accordingly, the cams 45 and 57 are arranged so that the high point of the latter is effective to latch the lever 55, before the high point of the former is effective to cause actuation of the tape feeding pawl 40 (see timing chart Fig. 6). For this reason, the latch lever 58 is arranged to be pivotally disposed on arm 55b. After the lever 55 is restored to normal, as shown in Fig. 5, and before the high point of cam 45 is effective to raise the latch arm 43 to its latched position, the pivoted latch lever 58 abuts the end of latch arm 43, and is only restored to latching position by spring 59, when the latch arm 43 is raised over the said lever 58. In this manner, tape feed operations are effected after the sensing pins are retracted from the tape, and latched in the said retracted positions. It should also be mentioned that a suitably pivoted restoring lever 65 is provided for positively moving the latch plate 62 to its normal position, when the arm 55c is raised.

Now, with reference to Figs. 1 and 2, it is seen, that cams 45 and 57 are secured to and driven by shaft 66 to which worm gear 67 is affixed, said gear being in mesh with a worm 68 constantly rotated by motor 69. Thus, the cams are operated continuously for controlling the sensing and tape feed operations, at such times when the control magnet 63 is energized. Also, if desired for various circuit controlling purposes, cams 70 and 71 are shown secured to shaft 66 for controlling the operations of the suitably disposed and related contacts C1, and C2, C3 respectively. In addition thereto, a suitable frictional drive may be provided for the take-up reel 35, by providing a driving pulley 72 on shaft 66, which pulley is connected by a spring belt 73 to intermediate pulley 74, the latter being secured to stud shaft 75 carrying pulley 76, which in turn is connected to pulley 77 mounted on the take-up reel shaft 78 by spring belt 79.

Referring to Fig. 3, additional circuit controlling means can be provided in the form of contacts 80, which are arranged to be opened, upon exhaustion of the tape supply to the sensing pins 50. The tape guide arm is secured to shaft 81 journaled in the side plate 39a, which shaft also carries bell crank lever 82. By means of spring 83, the said bell crank and tape guide arm are normally urged in a clockwise direction so that an insulating pin 84, secured to lever 82, opens contacts 80. This motion, however, is prevented when the supply of tape from roll 28 is not exhausted, due to the tape riding over the guide arm 30 and causing the said guide arm and pin 84 to be held in the positions shown in Fig. 3. An arcuately shaped and slotted tape guide member 85 is also provided to press the tape against the sprocket wheel 33, which member is secured to stud shaft 86 journaled in side plate 39a. Also secured to stud shaft 86 is a depending arm 87 arranged to engage the suitably disposed toggle spring 88. The said arm 87 is capable of engaging a pin 89 (secured to lever 82), whenever the guide member 85 is raised manually (for example, during insertion of a new tape), to rotate the bell crank lever 82 and tape guide arm 30 in a counterclockwise direction, thus facilitating tape removal or insertion operations.

In order to insure proper synchronous operations of the described elements, it is preferred to include the cam controlled contacts C1 in the circuit connected to the control magnet 63. In this manner, irrespective of the times the control impulses are impressed upon the circuit including magnet 63, the latter is not energized to release the said lever 55 until a predetermined time during each cyclic rotation of cams 45 and 57, as indicated in the timing chart in Fig. 6. Thus, it is seen, by this provision, that the operated elements are influenced and actuated in the described sequences.

While there has been shown and described and pointed out the fundamental novel features of the invention as applied to a single modification, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A telegraphic tape transmitter comprising a plurality of constantly rotating cam elements, tape feeding means including a feeding pawl and a latch lever actuated by one of the said constantly rotating cam elements, a positionable inverted T lever having one arm thereof actuated by another of said constantly rotating cam elements, a plurality of sensing elements controlled by said T lever for sensing the telegraphic tape, said cam elements being arranged to render the tape feeding pawl effective after the actuation of the said T lever, electro-mechanical latching means for latching another arm of the said T lever and rendering the second mentioned constantly rotating cam element ineffective for further actuating the said T lever and sensing elements, and additional latching means pivotally supported on still another arm of the said T lever for latching the said latch lever and rendering the first mentioned constantly rotating cam element ineffective for further actuating the said tape feeding pawl, said additional latching means being arranged to permit a tape feeding operation after the latching of the said T lever.

2. A telegraphic tape transmitter comprising a plurality of constantly rotating cam elements, tape feeding means including a feeding pawl and a latching lever actuated by one of said cam elements, a positionable inverted T lever having one arm thereof actuated by another of said cam elements, means controlled by said T lever for sensing the telegraphic tape, electro-mechanical latching means for latching another arm of the said T lever and rendering the said second mentioned cam element ineffective for further actuating the said T lever and sensing means, and additional latching means pivotally supported an still another arm of the said T lever for latching the said latch lever and rendering the said first mentioned cam element ineffective for further actuating the said tape feeding pawl.

3. A telegraphic tape transmitter comprising a plurality of constantly rotating cam elements, tape feeding means including a feeding pawl and a latch lever actuated by one of said cam elements, a positionable inverted T lever having one arm thereof actuated by another of said cam elements, means controlled by said T lever for sensing the telegraphic tape, latching means for latching another arm of the said T lever and rendering the second mentioned cam element ineffective for further actuating the said T lever and sensing means, and additional latching means pivotally supported on still another arm of the said T lever for latching the said latch lever and rendering the first mentioned cam element ineffective for further actuating the said tape feeding pawl.

4. A telegraphic tape transmitter comprising a plurality of constantly rotating cam elements, tape feeding means including a feeding pawl and a latch lever actuated by one of said cam elements, a positionable three armed lever having one arm thereof actuated by another of said cam elements, means controlled by said three armed lever for sensing the telegraphic tape, latching means for latching a second arm of said lever and rendering the second mentioned cam element ineffective for further actuating the said three armed lever and sensing means, and additional latching means pivotally supported on the third arm of said lever for latching the said latch lever and rendering the first mentioned cam element ineffective for further actuating the said tape feeding pawl.

5. A telegraphic tape transmitter comprising continuously operating driving means, tape feeding means actuated by said driving means, positionable means also actuated by said driving means, means controlled by said positionable means for sensing the telegraphic tape, electro-mechanical means for latching said positionable and sensing means and rendering the driving means ineffective for further actuating the positionable means, and additional means rotatably supported by said positionable means for cooperating with the tape feeding means and rendering the driving means ineffective for further actuating the tape feeding means, said additional means being arranged for permitting a tape feeding operation after the latching of the said positionable and sensing means.

6. A telegraphic tape transmitter comprising continuously operating driving means, tape feeding means actuated by said driving means, positionable means also actuated by said driving means, means controlled by said positionable means for sensing the telegraphic tape, electro-mechanical means for latching the said positionable and sensing means and rendering the driving means ineffective for further actuating the positionable means, and additional means cooperating with the positionable and tape feeding means for rendering the driving means ineffective for further actuating the tape feeding means, said additional means being arranged for permitting a tape feeding operation after the latching of the said positionable and sensing means.

7. A telegraphic tape transmitter comprising continuously operating driving means, tape feeding means actuated by said driving means, positionable means also actuated by said driving means, means controlled by said positionable means for sensing the telegraphic tape, means for latching said positionable and sensing means and rendering the driving means ineffective for further actuating the positionable means, and additional means cooperating with said positionable and tape feeding means for rendering the driving means ineffective for further actuating the tape feeding means, said additional means being arranged for permitting a tape feeding operation after the latching of the said positionable and sensing means.

8. A telegraphic tape transmitter comprising continuously cyclically operable driving means, means for sensing the telegraphic tape, positionable means for controlling the operation of the sensing means, magnet controlled means for normally latching the positionable means and sensing means in an inoperative position, tape feeding means and latch means cooperating with said positionable means for normally latching the tape feeding means in an inoperative position, and individual means included in said tape feeding means and positionable means for cooperating with the said driving means for actuating the said tape feeding means, the said positionable and sensing means, for one cycle, upon momentary energization of the said magnet controlled means.

9. The invention set forth in claim 8 wherein the said tape feeding latch means includes a latching element pivotally supported on the said positionable means.

10. The invention set forth in claim 8 wherein the said positionable means comprises a three armed lever, and the said tape feeding latch means includes a latching element pivotally supported on one of the arms of said lever.

11. The invention set forth in claim 8 wherein the said positionable means comprises an inverted T lever, and the said tape feeding latch means includes a latching element pivotaly supported on the upright arm of said lever.

12. The invention set forth in claim 8 wherein the driving means includes cam elements arranged for effecting actuation of the tape feeding means after the operation of the said sensing means.

ALBERT W. MILLS.
FRANK J. FURMAN.